March 24, 1925.
L. E. MILKEY
1,530,845
FILTERING DEVICE
Filed June 30, 1922    2 Sheets-Sheet 1
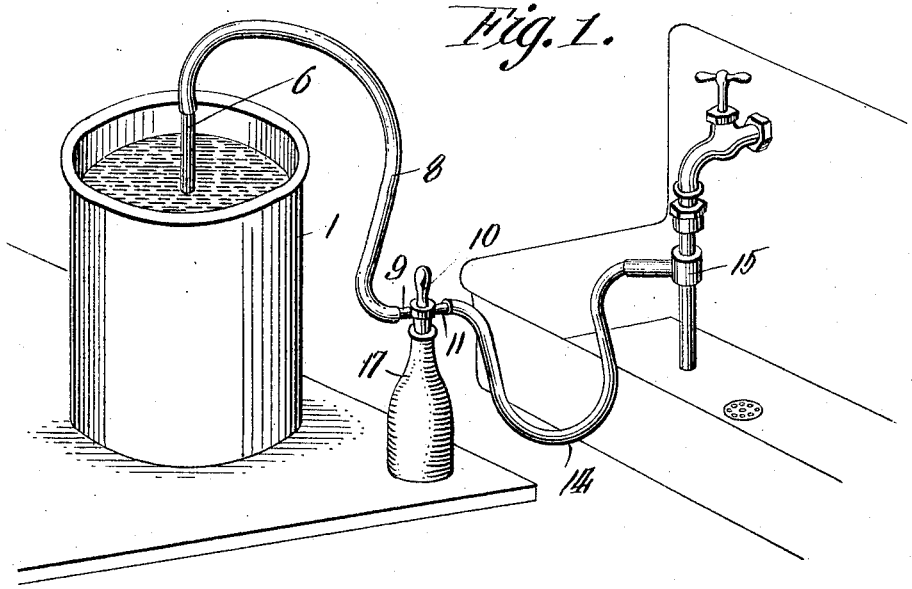
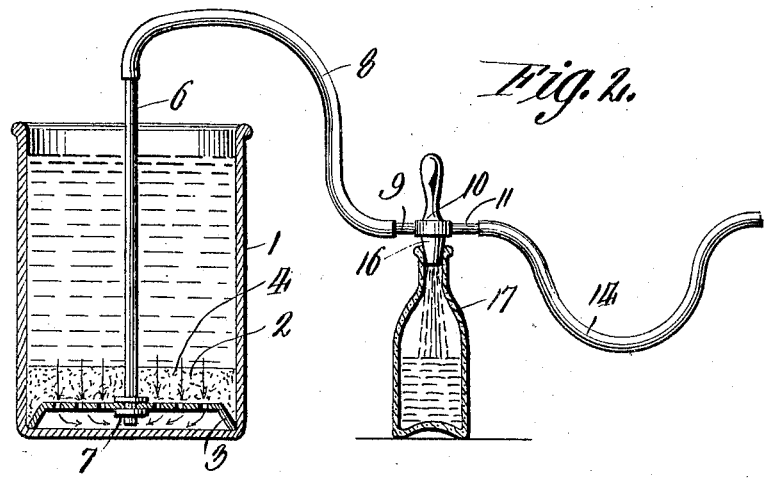
WITNESSES
Inventor
LESTER E. MILKEY
By Richard B Owen
Attorney

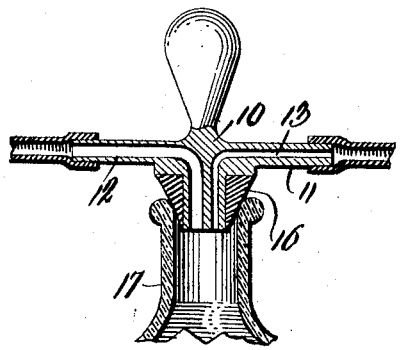
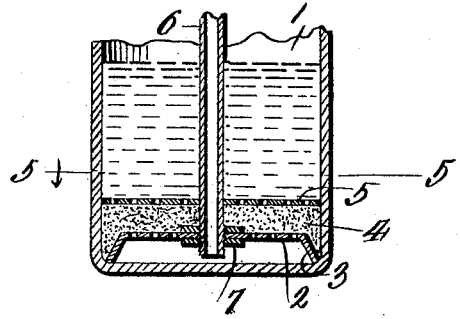
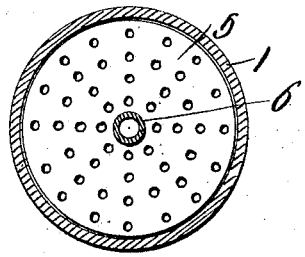

Patented Mar. 24, 1925.

1,530,845

UNITED STATES PATENT OFFICE.

LESTER E. MILKEY, OF SANDUSKY, OHIO.

FILTERING DEVICE.

Application filed June 30, 1922. Serial No. 571,923.

*To all whom it may concern:*

Be it known that I, LESTER ERNEST MILKEY, a citizen of the United States, residing at Sandusky, in the county of Erie and State of Ohio, have invented certain new and useful Improvements in a Filtering Device, of which the following is a specification.

The present invention relates to a filtering device having for its principal object to provide means whereby a liquid may be filtered and delivered into storing or transporting receptacles.

Another important object of the invention is to provide a filtering device of this nature which will be simple and efficient in construction, reliable in operation, comparatively inexpensive to manufacture, durable, handy, readily operated and well adapted to the purpose for which it is designed.

With the above and numerous other objects in view as will appear as the description progresses, the invention resides in certain novel features of construction, and the combination and arrangement of parts as will be hereinafter more fully described and claimed.

In the drawing:—

Figure 1 is a perspective of an apparatus embodying my invention,

Figure 2 is a section taken vertically through the two receptacles,

Figure 3 is an enlarged fragmentary detailed section showing the neck of the receiving receptacle and the filling plug therefor, Figure 4 is a detailed vertical section through the lower portion of the main receptacle, and Figure 5 is a transverse section taken substantially on the line 5—5 of Figure 4 looking in the direction of the arrow.

Referring to the drawing in detail it will be seen that 1 designates the main receptacle containing the fluid to be filtered and may be in the form of a crock of earthern material or of any preferred construction. A perforated plate 2 is situated in the bottom of the main receptacle 1 and is provided with the flaring depending flange 3 so as to hold the plate 2 in spaced relation to the bottom of the receptacle 1. Suitable filtering material such as filtermass is disposed on top of the plate 2 as is indicated at 4 and if desired, a retaining plate 5, as shown in Figures 4 and 5 may be positioned on top of this filtering material and this plate 5 is provided with a plurality of apertures so as to allow the liquid to pass therethrough and filter to the bottom of the receptacle 1. A pipe 6 is vertically and centrally located in the main receptacle 1 passing through the plates 2 and 5 and through the filtering material 4 being provided at its lower end with threads engageable with a threaded opening in the plate 2 and locked against removal by the nuts 7. This pipe 6 terminates a slight distance above the bottom of the receptacle 1 and preferably a distance above the top thereof. A suitable hose 8 is attached to the pipe 6 at one end and to the arm 9 of the filling plug 10 at its other end. This plug 10 includes the diametrically disposed arms 9 and 11 which arms are of hollow construction having passageways extending therethrough which also extend through the body of the plug so as to form the L-shaped passageways indicated at 12 and 13, the passageway 12 preferably being larger in diameter than the passageway 13. A hose 14 is attached to the arm 11 so as to be in communication with the passageway 13 and any suitable suction pipe or like device is attached to this device such as is indicated at 15.

A conical shaped washer 16 is disposed about the body of the plug 10 so that the same may be inserted in the neck of a bottle or receiving receptacle 17.

The main receptacle 1 having been filled with the unfiltered liquid, to operate the device all that is necessary is to start the suction pump or device 15 which in the present instance is done by turning the water on and allowing the same to flow through the suction device 15. This tends to cause the vacuum in the receiving receptacle 17 hose 18 and pipe 6 whereby the liquid in the main receptacle 1 will be drawn through the filtering material 4 up through the pipe 6 and through the hose 8 into the receiving receptacle 17 until it is filled to the desired level at which time the suction device is turned off and a new receiving receptacle substituted.

The modification of the invention which I have disclosed and described with some degree of particularity relates only to the preferred embodiment of the invention and has been given by way of example so as to clearly demonstrate a practical, efficient, and simple exemplification of the use, structure, and operation of my invention. It is to be understood that numerous changes in the details of construction and in the combination and arrangement of parts may be resorted to without departing from the spirit of the invention as hereinafter claimed.

Having thus described my invention what I claim as new is:—

A filtering device of the class described including a receptacle, a perforated plate having a depending flaring flange seated on the bottom of the receptacle, filtering material disposed on top of the perforated plate, and a pipe passing through the filtering material and the perforated plate having its bottom end terminating between the plate and the bottom of the receptacle.

In testimony whereof I affix my signature in presence of two witnesses.

LESTER E. MILKEY.

Witnesses:
R. F. KNAUER,
CLARA L. MILLKE.